United States Patent
Schlitz et al.

[15] 3,656,816
[45] Apr. 18, 1972

[54] BRAKING SYSTEM WITH DECELERATION DERIVATIVE CONTROL

[72] Inventors: Erwin Schlitz, Heusenstamm; Werner Fink, Frankfurt Am Main, both of Germany

[73] Assignee: International Telephone and Telegraph Corporation, New York, N.Y.

[22] Filed: July 9, 1969

[21] Appl. No.: 840,390

[52] U.S. Cl. ............................ 303/21 P, 137/625.4, 303/20, 303/21 F
[51] Int. Cl. .................................. B60t 8/08, F15b 13/02
[58] Field of Search ............... 188/181 A, 181 C; 303/21 A, 303/21 F, 21 P, 21 BB, 21 BE, 21 CG, 21 EB, 20; 137/625.64, 625.65; 60/221; 324/162; 340/262

[56] References Cited

UNITED STATES PATENTS

| | | | |
|---|---|---|---|
| 3,572,848 | 3/1971 | Marouby | 303/21 BE |
| 3,433,536 | 3/1969 | Skinner | 188/181 C X |
| 3,362,757 | 1/1968 | Marcheron | 303/21 A |
| 3,486,801 | 12/1969 | Frayer | 303/21 F |
| 3,494,671 | 2/1970 | Slavin et al. | 303/21 A |
| 3,286,734 | 11/1966 | Hartshorne | 303/21 F X |
| 3,532,392 | 10/1970 | Scharlack | 303/21 EB |
| 3,532,393 | 10/1970 | Riordan | 303/21 EB |

*Primary Examiner*—Milton Buchler
*Assistant Examiner*—Stephen G. Kunin
*Attorney*—C. Cornell Remsen, Jr., Walter J. Baum, Paul W. Hemminger, Percey P. Lantzy and Thomas E. Kristofferson

[57] ABSTRACT

A wheel anti-lock braking device especially adapted to automotive systems is described. A wheel tachometer generator develops an angular velocity signal, which, twice differentiated, becomes the derivative of acceleration or a term herein called "ruck." This term indicates angular acceleration changes and is used to optimize braking pressure at the point approximating maximum tire-to-road friction and thereby averting wheel locking and consequent skid. Control is effected through a partially electrical and partially hydraulic regulatory servomechanism.

7 Claims, 5 Drawing Figures

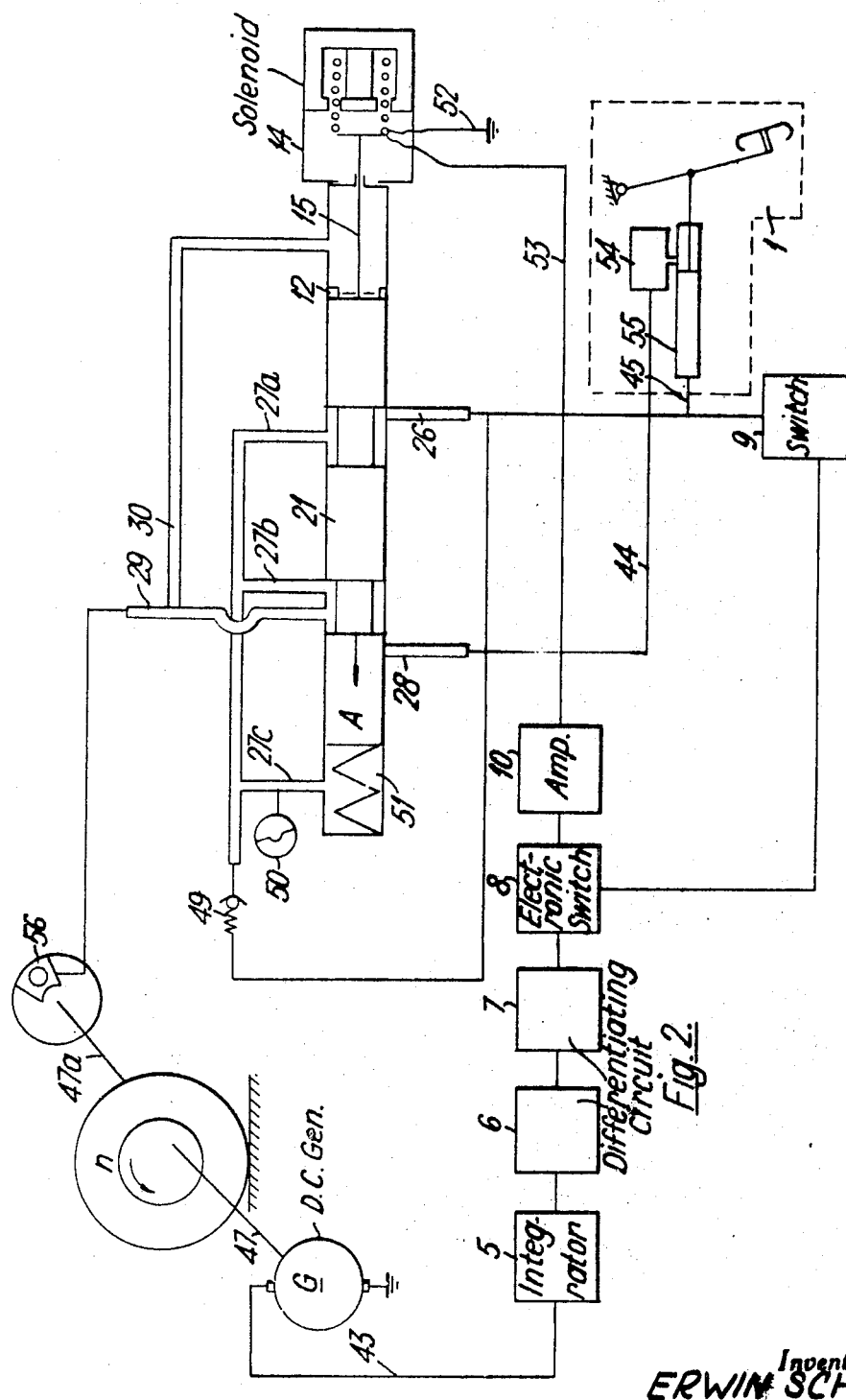

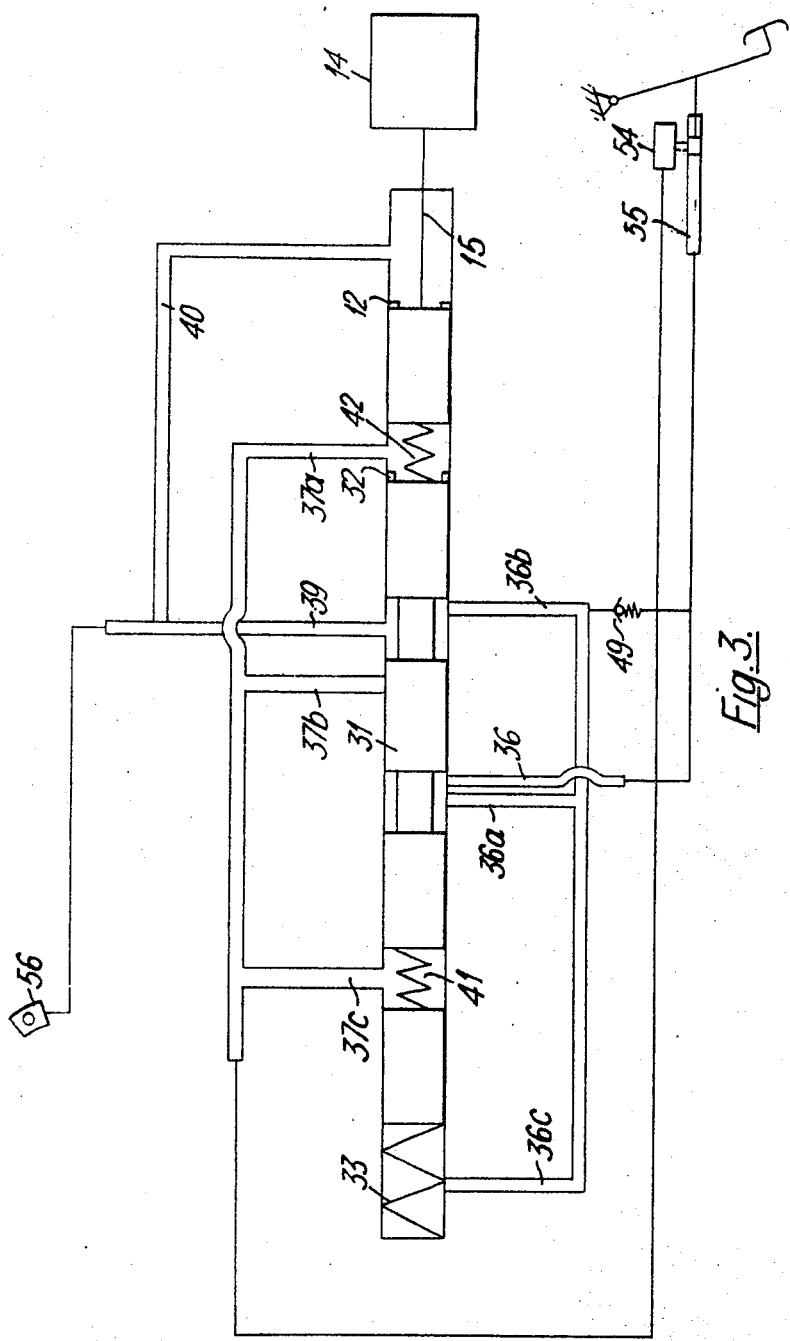

BRAKING SYSTEM WITH DECELERATION DERIVATIVE CONTROL

BACKGROUND OF THE INVENTION

1. Field of the Invention

This invention relates broadly to braking systems and more specifically to braking systems with inherent regulatory features to prevent wheel locking and sliding.

2. Description of the Prior Art

Various forms of brake regulating and anti-wheel lock devices have been known in the prior art. The most pertinent prior art structures involve those which include sensor means for measuring the rotary deceleration of a wheel, such as a direct or alternating current (tachometer) generator. Such a generator produces a voltage proportional to the angular velocity, as for example, rpm. In such devices, the variation of the output voltage is recognized as an acceleration term either positive or negative (deceleration); any value of deceleration in excess of a predetermined maximum then corresponds to the beginning of slide or wheel lock. Upon the detection of such a condition, a control signal is developed which electrically or hydraulically relieves braking pressure sufficiently to rectify the slippage or wheel lock condition, although not always before the development of a dangerous condition.

Another prior art approach to the problem involves measurement of the moment produced as a function of the coefficient of wheel-to-road surface friction and comparison with another moment resulting from brake drag.

In such a system, the moment between brake shoe and friction face becoming higher than between wheel and road indicates beginning slippage. For regulation, a controlling piston is moved against the force of a spring. Such an arrangement cannot operate reliably under all circumstances because, under some conditions, the said coefficient of friction does not drop with an arising slip.

Still other prior art constructions involve inertia switches set to activate at a predetermined limiting value of deceleration. The braking pressure is reduced by a predetermined amount or actually removed entirely in order to hold wheel deceleration below the predetermined maximum. Yet other prior art systems involve the interruption of an electrically actuated braking circuit in the case of a wheel slide. Restoration of braking pressure is effected as soon as the wheel has regained the angular velocity corresponding to the motion of the vehicle. Most of the prior art devices for accomplishing the anti-wheel lock function operate as elementary servomechanisms only approximately correcting the problem, and their construction is generally relatively expensive and fairly complex. Accordingly, such complex systems are subject to poor reliability. Moreover, none of the prior art systems known provides anticipation of excessive slippage, and regulation to a predetermined acceptable slippage value.

In the present invention, a closed loop system responsive to the derivative of deceleration provides the optimum regulation because the controlling variable of the circuit is a measure of angular acceleration charge, and an overcoming slip can therefore be predicted.

SUMMARY

In consequence of the disadvantages of prior art systems, it was the general objective of the present invention to construct a relatively simple electro-hydraulic anti-wheel-lock device for a hydraulic brake which would be controlled by an anticipatory variable so that the wheel lock condition would not be permitted to develop.

In accordance with this objective, a novel structure was developed to provide optimum brake operation regulated to a value of slippage approximately corresponding to a maximum coefficient of friction. It will be evident that in employing maximum braking torque at a vehicle wheel, the best that can be hoped for is to brake in the maximum frictional situation.

In automotive systems, resilient pneumatic tires fabricated from natural or synthetic rubber are universal. Such tires have a definite slip vs. coefficient of friction characteristic. As will be understood from subsequent discussion, the said pneumatic tire affords its maximum braking capability during application of a braking couple great enough to cause some "wiping" action or finite allowable slippage.

The tire-to-road surface coefficient of friction is less in both extremes, i.e., uninhibited rolling friction on the one hand, and locked wheel sliding (skidding) on the other hand.

One of the concepts the present invention is based on, is the concept that an angular velocity sensor provides the necessary basic data from which two successive derivatives may be taken. The first derivative is obviously an acceleration (or deceleration in the case of braking) term and the second derivative, or in other words, the derivative of deceleration, will be understood to be a "lead" term which is relatable to slippage.

During braking there is an obvious angular deceleration present and its derivative, or rate of change, (herein referred to as "ruck") provides the basis for optimizing deceleration by controlling to a predetermined value thereof.

Three brake embodiments are hereinafter illustrated and described. All are partially electrical and partially hydraulic, it being assumed a hydraulic braking system will be employed.

An electric tachometer generator with electronic differentiators and electronic and pressure sensitive switches are included to electrically produce the so-called "ruck" signal.

When the said "ruck" signal exceeds a predetermined threshold value and braking pedal pressure is sufficient to require the automatic regulation, the "ruck" signal is power amplified and applied to a solenoid controlling a unique sliding piston-type valve arrangement.

The electrical and hydraulic components of this control system constitute a servomechanism of unique structure and function for effecting the said "ruck" control.

BRIEF DESCRIPTION OF THE DRAWINGS

FIG. 2 illustrates a variation of FIG. 1 in which increased brake pedal pressure during operation of the regulating system is prevented from countermanding automatic regulation.

FIG. 3 illustrates yet another embodiment of the present invention and variation of FIG. 2, providing for an elastic hydraulic reservoir function within the sliding cylinder valve assembly.

DESCRIPTION OF THE PREFERRED EMBODIMENTS

Figure 1:
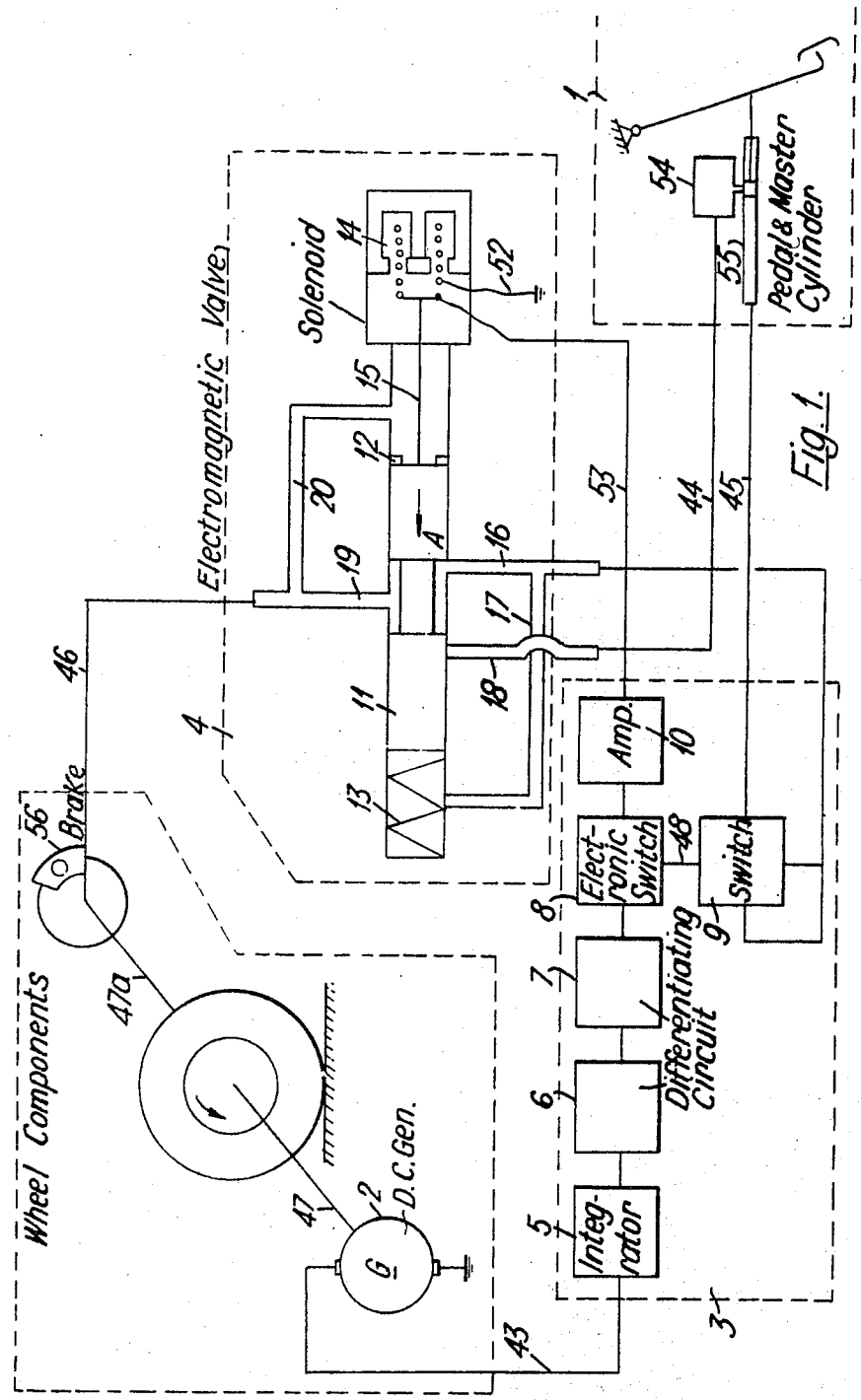
FIG. 1 schematically illustrates a control system of the present invention in relatively simple form.

Referring now to the drawings, three variations in the details of construction of the overall control device of the present invention are depicted in FIGS. 1, 2 and 3. Before a detailed discussion of these figures is undertaken, the attention of the reader is directed to FIG. 4 in which the coefficient of friction between wheel and running surface $\mu$ is plotted as a function of percentage slippage along the contact surface, under braking conditions.

The term slippage (s) is defined as follows:
$$s = \zeta_o - \zeta/\zeta_o$$
Obviously, depending upon road surface conditions, slippage may vary between "0" (normal rolling frictional conditions) and 100%, corresponding to the locked wheel conditions. The four curves in FIG. 4, identified as curves $a$ through $d$, correspond to conditions as follows:

| | |
|---|---|
| a | wet road |
| b | dry road |
| c | ice or snow surface |
| d | idealized tire-to-surface characteristic as envisioned from the trend of the tire development. |

In the foregoing slippage equation, $\zeta_o$ is the angle of rotation of a wheel moving without slippage (normal rolling frictional contact), and $\zeta$ is the angle of rotation of a wheel moving with slippage.

Figure 4:
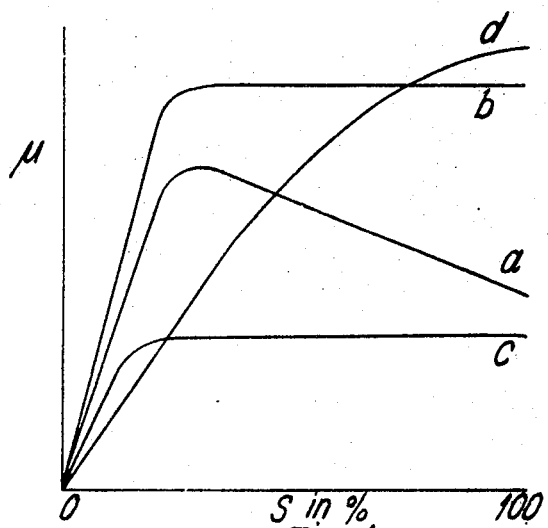
FIG. 4 depicts a family of curves of typical coefficient of tire-to-road surface friction $\mu$ as a function of percentage of slippage.

The exact shape of the curves of FIG. 4 depends on a number of external conditions such as the surface material of the road, speed from which braking is undertaken, wear of tires and other factors. Accordingly, these relationships depicted in FIG. 4 are understood to be representative and only subject to accurate determination empirically.

It is well understood that braking at the point of maximum coefficient of friction under a given set of conditions permits the most rapid reduction in wheel angular velocity and therefore, of vehicle motion. Curve 4 will accordingly be understood to show that this coefficient of friction varies in its relationship to slippage in accordance with the external conditions as aforesaid. Slippage is an achievable independent variable, subject to control, whereas road friction varies and is not a reliable control criteria.

Figure 5:
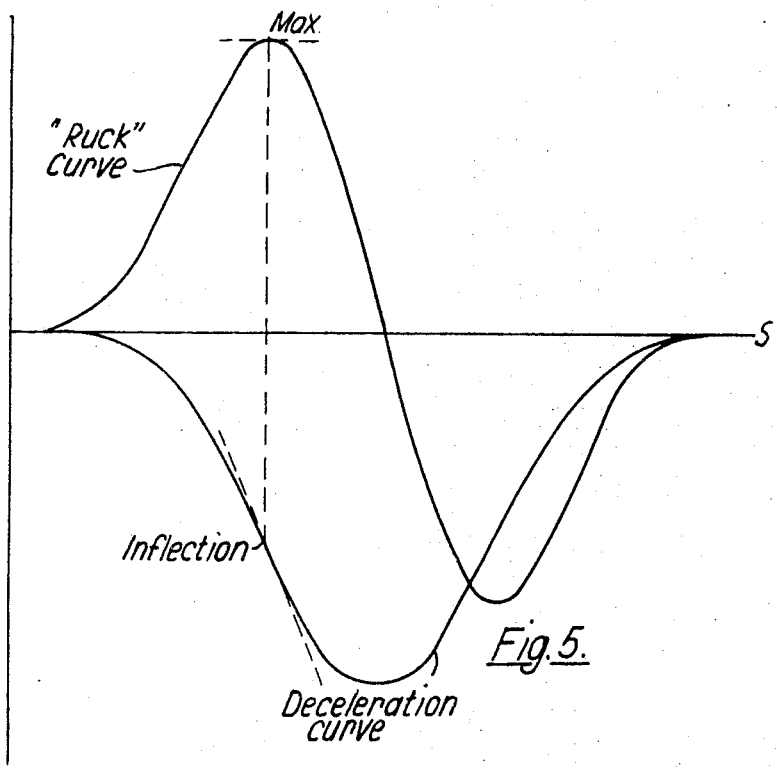
FIG. 5 depicts a curve of the so-called "ruck" resulting from differentiation of a typical curve of deceleration vs. tire-to-road surface slippage.

When the friction coefficient between tire and road decreases to a certain value of slippage (about 15 to 20 percent), at this point the deceleration of the motor vehicle decreases as slippage increases. FIG. 5 depicts this fact and, in fact, locates an inflection point at which the deceleration curve ceases to be concave downward and begins to be concave upward.

From the basic principles of calculus, it is known that the rate of change of the deceleration at that inflection point is greatest and, accordingly, the value of "ruck" (derivative of deceleration) maximizes there. As a next logical step, one realizes therefore, that control based on "ruck" maximization effects rapid deceleration without permitting the slippage to increase past the diminishing rate point in the deceleration vs. slippage relationship. In this way, the point of wheel lock is comfortably avoided without sacrificing optimum braking.

Referring now to FIG. 1, a typical system in accordance with the broader aspects of the present invention is depicted.

Wheel components, including a wheel connected on the one side to a tachometer (DC) generator 2 is directly responsive to the angular velocity of the wheel through a shaft 47. On the other side of the wheel a brake is coupled to the wheel via shaft 47a. Said brake is illustrated as though it were a caliper type disc brake, although the system is equally adapted to drum and shoe brake systems. The caliper portion 56 is to be understood to contain hydraulic actuating means responsive to hydraulic pressure on the line 46, and the generator 2 delivers an output voltage with respect to ground on line 43. Although generator 2 is represented as DC generator, it could also comprise an AC generator with appropriate rectification means provided the resulting delay in developing the voltage analog corresponding to any wheel angular velocity is suitably short. Thus a voltage analog of the wheel angular velocity appears on 43, preferably having a linear voltage vs. angular velocity characteristic.

It would be possible to introduce circuit means to compensate for a non-linear voltage analog, but additional components would thereby be required.

The electrical control components of the device are included in block 3 wherein an integrator 5 smooths the tachometer voltage on 43. Integrator 5 is understood not to be a classical long-term integrator essentially increasing its output value to give a produce of input and time. Rather, it only integrates in a short term sense to smooth out minor electrical variations. Thus, the output of integrator 5 continues to be the analog of wheel angular velocity.

A differentiating circuit 6 provides an output which is the analog of acceleration in accordance with known principles, and further differentiation in circuit 7 likewise produces a signal which is the analog of the rate of change of acceleration or "ruck" as it has herein been called.

Obviously, in a braking system, one is only interested in values of the so-called "ruck" during times of brake application. The block 1 includes the normal brake actuating pedal connected to a master cylinder 55, which is, in turn, connected to a hydraulic oil reservoir 54 in a well understood manner. The hydraulic line 45 carrying the master cylinder pressure passes through a hydraulically actuated switch 9 and thereafter enters the electromechanical valve assembly 4 via hydraulic line 16.

The switch 9 thus connected via lead 48 to the electronic switch 8 performs the function of enabling the control system during a braking operation. Electronic switch 8 is constructed so as to pass the "ruck" analog voltage 7 to the amplifier 10 when switch 9 is actuated, if and when the said "ruck" analog exceeds a predetermined threshold value. Obviously, during light braking, the automatic operation of the systems of the present invention is not required and therefore, when the switch 9 closes under those circumstances, the electronic switch 8 passes no signal since values of "ruck" under light braking conditions would be expected to be below the predetermined threshold of slippage and the corresponding "ruck" threshold built into 8. In other words, during light braking, hydraulic pressure passes directly from line 45 through switch 9 into line 16 and out line 19 to the brake actuator 56 via line 46.

Presuming now conditions of braking sufficient to generate a "ruck" analog exceeding the said electronic threshold, switch 8 then triggers into operation to provide the "ruck" analog, power amplified at 10 to the winding of a solenoid 14 via lead 53. Lead 52 merely provides a ground return for the solenoid winding. The said solenoid 14 is capable of axial actuation of a sliding cylindrical valve arrangement via tie-rod 15. The said sliding piston 11 can be moved in the direction of the arrow "A" from its rest position, which is against buffer 12. The sliding piston 11 will be seen to comprise two sections of full diameter within a cylinder housing connected in the middle by a length or rod of smaller diameter. A chamber is thus generated straddling the output hydraulic connection 19.

Initially, hydraulic pressure from the master cylinder 55 reaches 56, since there is continuity between hydraulic connections 16 and 19, as illustrated in FIG. 1. The solenoid 14 advances the valve piston 11 in the direction "A" as a function of the applied "ruck" analog on lead 53. That is to say, the operating power of the said solenoid is proportional to the "ruck" and is applied to the solenoid to advance the sliding piston accordingly when there is a "ruck" signal sufficient to exceed the aforementioned switch threshold.

A first regulatory stage movement of the valve piston in the "A" direction closes off hydraulic connection 16 before it slides far enough to open hydraulic connector 18 to continuity with 19. Spring 13 serves only to lightly retain the valve piston 11 against the buffer 12 and is not a substantial factor in resisting the hydraulic or electromechanical solenoid forces involved.

Channels 17 and 20 serve to equalize hydraulic pressure against the two extreme ends of the sliding piston valve 11. As the "ruck" actuated control comes into operation, the sliding piston valve 11 is pushed in the direction "A" to a point where the oil pressure plus solenoid thrust balances the residual oil pressure from the other end of the piston valve. This new equilibrium will be understood to occur before the hydraulic pressure connection 16 is closed off due to sliding of 11 in the "A" direction, and remains so long as the foot pedal pressure is not increased so as to raise the pressure in the chamber surrounding spring 13 via hydraulic connection 17 which remains under the influence of master cylinder pressure.

Continuity between 16 and 19 having been closed off however, the brake cylinder at 56 no longer directly responds to master cylinder pressure.

At this point it may be said that the effect of the "ruck" analog has been to prevent the application of additional hydraulic pressure to 56. It will be noted at this point that if the "ruck" continues to build up, causing the solenoid to thrust the piston valve 11 further in the "A" direction, the relief hydraulic connection 18 comes into communication with 19 and some hydraulic fluid bleeds back through line 46 via 18 and 44 into the reservoir 54.

The resultant relief of braking forces decreases the rate of wheel deceleration and the "ruck" signal then swings into negative direction back toward the initial or quiescent position.

Considering the system just described as an electro-hydraulic servo-mechanism, factors such as regulatory loop gain become of interest. Under certain circumstances, it will be realized that the regulating system will oscillate or hunt about the optimum "ruck" value, a situation which is not necessarily objectionable. Low system gain would tend to make the regulatory function operate to approach the control point corresponding to maximum "ruck" without overshooting.

In some instances it may be considered disadvantageous that during regulation, the piston valve 11 is still subject to additional pedal pressure transmitted from the master cylinder 55 into 17 and the chamber about the spring 13. Such pressure tends to counteract the solenoid thrust and therefore works against the regulation function.

Referring now to FIG. 2, a modified hydraulic circuit is shown, providing relief from the foregoing disadvantage. In this embodiment, the piston valve 21 (sliding element) is divided into three full diameter parts separated by two reduced diameter sections creating a pressure chamber into which hydraulic lines 29 and 27b connect, as well as the one connecting lines 27a and 26. The chamber around rod 15 and surrounding the spring 13 continue, the latter now being identified as 51.

In FIG. 2 the wheel components, electric control components 3, and the pedal and master cylinder components 1 are duplicated, although slightly rearranged.

It will be noted that the hydraulic connections 26, 27a, 27b, 27c, 29 and 30 provide pressure compensation to the surfaces of the piston valve 21 so that, as before, the piston valve is not directly responsive to master cylinder pressure.

Upon operation of the pedal in FIG. 2, normal hydraulic pressure reaches 56 from 55 via 45, 26, 27a, 27b and 29 and the equalization paths are all operative. When the "ruck" control comes into operation by means of the same operations discussed in connection with FIG. 1, hydraulic connections 26 and 27b are first closed, cutting off pedal and master cylinder influence on the system. Pressure medium from the chamber 51 can then flow through 27c into the elastic reservoir or tube 50.

During regulation stage two, the further advance of 21 in the "A" arrow direction uncovers hydraulic connection 28, whereby excess fluid pressure is relieved from 56 via 29, 28 and 44 into reservoir 54, as before.

An anti-backflow valve 49 prevents the flow of hydraulic fluid through itself, except when brake pedal (master cylinder) pressure falls lower than the pressure applied to 56, thereby permitting the brake to follow the pedal down even before reset of 21.

The system resets itself electrically in the same manner as discussed for FIG. 1.

Yet another embodiment is depicted in FIG. 3. This latter configuration eliminates the need for the external elastic reservoir of FIG. 2.

The same things may again be said about the control and wheel components, i.e., although they have been largely omitted from the showing of FIG. 3, they are to be considered included in the embodiment of FIG. 3 as in FIG. 1.

FIG. 3 differs in that the sliding piston valve 31 is divided into five segments, the central three of which are joined as in FIG. 2, but the outer ones are resiliently connected by springs in chambers 41 and 42. The structure does not include pressure equalization means for chambers 41 and 42, as their function depends on deformation of the springs therein and the resulting change of volume in these chambers.

In FIG. 3, the "ruck" controlled regulation is independent of increasing master cylinder pressure. The springs 41 and 42 function analogously to hydraulic accumulators.

In the initial (quiescent) sliding piston valve position, spring 33 keeps the entire piston assembly 31 lightly at rest against buffer 32 and spring 42 keeps the right piston segment against buffer 12.

Upon initial brake application, the pressure of master cylinder 55 will be transmitted to 36, through the associated chamber and out 36a to 36b, out that associated chamber and via 39, to the brake cylinder at 56. Additional pressure equalization lines are 36c and 40 to introduce master cylinder pressure to the extreme end chambers, i.e., those containing spring 33 and push rod 15. The two middle chambers will be seen to be equalized in the manner previously described, through connections 36, 36a, 36b, 36c, 39 and 40. The chambers, being without pressure equalizing connections, the springs 41 and 42 are in partial compression in the quiescent condition.

Continuing to describe the operation of FIG. 3, it will be noted that movement of the piston valve by solenoid 14 first closes the hydraulic connection 36, thereby isolating the master cylinder so that it no longer determines the pressure at 56. In response to a still higher "ruck" value, 37b is opened and pressure medium from the hydraulic circuit 39 and the associated chamber is permitted to flow through 39 and 37b into 37a and 37c and into the connecting chambers around springs 41 and 42, thereby discharging the compression of these springs. In this way, the functional equivalent of the external elastic reservoir 50 of FIG. 2 is achieved by structure entirely within the piston valve assembly.

The said piston valve assembly is in practice, small in size and readily manufactured. Accordingly, it is a relatively economical device in the form of either FIG. 1, 2, or 3.

The electronic components, such as the smoothing integrator 5, may be thought of as a low pass filter and as such, is readily instrumented. The differentiators may be as simple as the well-known series capacitor and resistance, a combination wherein the current through the resistor, and therefore the voltage drop across it, are representative of the derivative of the voltage applied across the capacitor and resistor series combination.

The power amplifier 10 and the electronic and pressure operated switches (8 and 9 respectively) are all susceptible of construction within ordinary skill in the pertinent arts.

From an understanding of the principles of the present invention, various modifications are possible within the scope of the invention. The drawings and description presented are to be regarded as illustrative only.

What is claimed is:

1. In a hydraulic brake system which includes at least one wheel cylinder connected by a hydraulic circuit to a master cylinder, means for regulating the pressure applied to said wheel cylinder to prevent wheel lock comprising:

means for generating an electrical analog of the angular velocity of a wheel;

means responsive to said angular velocity for generating a lead signal proportional to the second derivation of said angular velocity analog to indicate an incipient wheel lock;

switching means responsive to said lead signal and to the applied hydraulic master cylinder pressure for passing said second derivative signal whenever predetermined master cylinder pressure and second derivative signal thresholds are exceeded;

a hydraulic valve connected in the hydraulic circuit between said master cylinder and said wheel cylinder, said valve having an input device responsive to mechanical force to interrupt said hydraulic circuit upon activation of said input device through a first increment, and to partially relieve the pressure applied to said wheel cylinder upon further activation of said input device; and electro-mechanical means responsive to said second derivative signal and connected to accordingly operate said input device to interrupt said hydraulic circuit and to prevent wheel lock;

said means for generating an electrical analog of the angular velocity of said wheel is a tachometer generator having a direct current output at a voltage substantially proportional to said angular velocity; and said means for generating a lead signal including a pair of electrical differentiator circuits connected directly in series, thereby to obtain said lead signal as a second derivative of said electrical analog of angular velocity.

2. An automotive hydraulic brake system having a master cylinder with associated hydraulic fluid reservoir, at least one lining actuating wheel cylinder and a hydraulic line joining said master cylinder to said wheel cylinder comprising the combination of:

a hydraulic valve in series with said hydraulic line, said valve including a control shaft connected to slidably control a valve piston in a manner so as to interrupt said hydraulic line when said shaft is axially thrust by a first predetermined distance and to connect a pressure relief path between the wheel cylinder side of said hydraulic line and said reservoir when said control shaft is axially thrust by a second predetermined distance greater than said first predetermined distance;

means including a solenoid having an output shaft connected to said hydraulic valve control shaft, said solenoid having a winding and magnetic core whereby said axial thrust is controlled as a function of current in said winding; and electric control means for providing current to said winding proportional to the second derivative of angular velocity of the wheel corresponding to said wheel cylinder, said second derivative of angular velocity indicating an incipient wheel lock, said current causing said solenoid to control said hydraulic valve for interruption of said hydraulic line and thereby prevent a wheel lock;

said electric control means including a direct current generator for deriving a first voltage proportional to the angular velocity of said wheel and first and second differentiating circuits directly connected in series for providing a lead voltage which is representative of said second derivative of said angular velocity.

3. The invention set forth in claim 2 including an elastic accumulator hydraulically associated with a fluid chamber at the non-driven end of said piston valve and a unilateral pressure differential valve connected between the hydraulic line from said master cylinder and said accumulator, thereby to permit hydraulic fluid flow back toward said master cylinder when its pressure falls below that within the said accumulator.

4. An automotive hydraulic brake system having a master cylinder with associated hydraulic fluid reservoir, at least one lining actuating wheel cylinder and a hydraulic line joining said master cylinder to said wheel cylinder comprising the combination of:

a hydraulic valve in series with said hydraulic line, said valve including a control shaft connected to slidably control a valve piston in a manner so as to interrupt said hydraulic line when said shaft is axially thrust by a first predetermined distance and to connect a pressure relief path between the wheel cylinder side of said hydraulic line and said reservoir when said control shaft is axially thrust by a second predetermined distance greater than said first predetermined distance;

means including a solenoid having an output shaft connected to said hydraulic valve control shaft, said solenoid having a winding and magnetic core whereby said axial thrust is controlled as a function of current in said winding;

electric control means for providing current to said winding proportional to the second derivative of angular velocity of the wheel corresponding to said wheel cylinder, said second derivative of angular velocity indicating an incipient wheel lock, said current causing said solenoid to control said hydraulic valve for interruption of said hydraulic line and thereby prevent a wheel lock;

an elastic accumulator hydraulically coupled to said wheel cylinder formed by connecting at least one segment of said piston within said piston valve to the remainder of said piston only by means of a spring; and a unilateral pressure differential valve connected between the hydraulic line from said master cylinder and a fluid chamber at the non-driven end of said piston valve to thereby permit hydraulic fluid flow back toward said master cylinder when its pressure falls below that within said fluid chamber.

5. In a hydraulic brake system which includes at least one wheel cylinder connected by a hydraulic circuit to a master cylinder and means for regulating the pressure applied to said wheel cylinder to prevent wheel lock comprising:

means for generating an electrical analog of the angular velocity of a wheel;

means including two differentiating circuits directly connected together in series responsive to said angular velocity for generating a signal proportional to the second derivative of said angular velocity analog used to indicate an incipient wheel lock; and means responsive to the second derivative signal to prevent a further increase in the brake pressure in the hydraulic circuit and thereby prevent wheel lock when the second derivative signal exceeds a preset value.

6. A vehicle hydraulic brake circuit and anti-skid system of the type having a control device for generating an electrical control signal which is a function of the wheel speed signal and means responsive to the electrical control signal for regulating the brake pressure at the wheel to prevent skidding of the wheel, the invention characterized in that the control device comprises two differentiating circuits connected directly together responsive to said electric control signal for generating a signal which is the second derivative of the wheel velocity to indicate an incipient wheel lock and the means for regulating the brake pressure response to prevent a further increase in the brake pressure at the wheel and thereby prevent skidding of the wheel is activated when the second derivative of the wheel velocity exceeds a predetermined value.

7. An automotive hydraulic brake system having a master cylinder with associated hydraulic fluid reservoir, at least one lining actuating wheel cylinder and a hydraulic line joining said master cylinder to said wheel cylinder comprising the combination of:

a hydraulic valve in series with said hydraulic line, said valve including a control shaft connected to slidably control a valve piston in a manner so as to interrupt said hydraulic line when said shaft is axially thrust by a first predetermined distance and to connect a pressure relief path between the wheel cylinder side of said hydraulic line and said reservoir when said control shaft is axially thrust by a second predetermined distance greater than said first predetermined distance;

means including a solenoid having an output shaft connected to said hydraulic valve control shaft, said solenoid having a winding and magnetic core whereby said axial thrust is controlled as a function of current in said winding; and electric control means for providing current to said winding as a function of the second derivative of angular velocity of the wheel corresponding to said wheel cylinder;

said electric control means including a direct current generator for deriving a first voltage proportional to the angular velocity of said wheel and first and second differentiating circuits directly connected in series for providing a lead voltage which is representative of said derivative of said angular velocity; further including an elastic accumulator hydraulically coupled to said wheel cylinder formed by connecting at least one segment of said piston within said piston valve to the remainder of said piston only by means of a spring; and a unilateral pressure differential valve connected between the hydraulic line from said master cylinder and a fluid chamber at the non-driven end of said piston valve to thereby permit hydraulic fluid flow back towards said master cylinder when its pressure falls below that within said fluid chamber.

* * * * *